W. C. NORCROSS.
VALVE FOR JOLT RAMMING MACHINES.
APPLICATION FILED AUG. 30, 1917.

1,264,428.

Patented Apr. 30, 1918.

Witness
Philip E. Barnus

Inventor
William C. Norcross
By G. R. Shanlin
his Attorney

UNITED STATES PATENT OFFICE.

WILLIAM C. NORCROSS, OF TERRE HAUTE, INDIANA, ASSIGNOR TO AMERICAN MOLDING MACHINE CO., OF TERRE HAUTE, INDIANA, A CORPORATION OF INDIANA.

VALVE FOR JOLT-RAMMING MACHINES.

1,264,428.  Specification of Letters Patent.  Patented Apr. 30, 1918.

Application filed August 30, 1917. Serial No. 188,996.

*To all whom it may concern:*

Be it known that I, WILLIAM C. NORCROSS, a citizen of the United States, residing at Terre Haute, county of Vigo, and State of Indiana, have invented certain new and useful Improvements in Valves for Jolt-Ramming Machines, of which the following is a specification.

This invention relates to valves for jolt-ramming machines, particularly those employing a cylinder of small diameter.

In certain earlier patents, 1,031,084; 1,194,059; 1,231,187; 1,224,407; and application Serial No. 126,846, filed October 21, 1916, I have set forth valves for jolt-ramming molding machines, the purpose being to provide a valve which will effect the automatic reciprocation or jolting of the piston which carries the flask and mold to be jolted or rammed.

The present invention relates to valves for the aforesaid purpose and embodies improvements whereby the valve is peculiarly adapted to those jolting machines having a cylinder of relatively small diameter, wherein the foregoing valves are not so well adapted for use.

In the present invention, the valve embodies improvements whereby the operative parts are compactly arranged and yet are adapted to reliably function. To that end, the valve is located at one side of the piston, a shoe at the other side; the valve and shoe being held against the wall of the cylinder by an expansion coil spring interposed between them. The valve and shoe are arranged to be knocked up and down. As in my former valves, stools or pins serve to prevent the valve and shoe from knocking below what should be their normal position.

In an application for combination jolt-ramming and stripping machines Serial No. 188,995, filed Aug. 30, 1917, I have shown the present valve applied to a small diameter cylinder to illustrate its use but it is not restricted to use with that machine as it may be provided on any jolt-ramming machine.

The embodiment of the invention which is hereinafter set forth and shown in the accompanying drawings is to be considered only as illustrative of the invention as modifications may be resorted to without departing from the principles of the invention.

Figure 1:
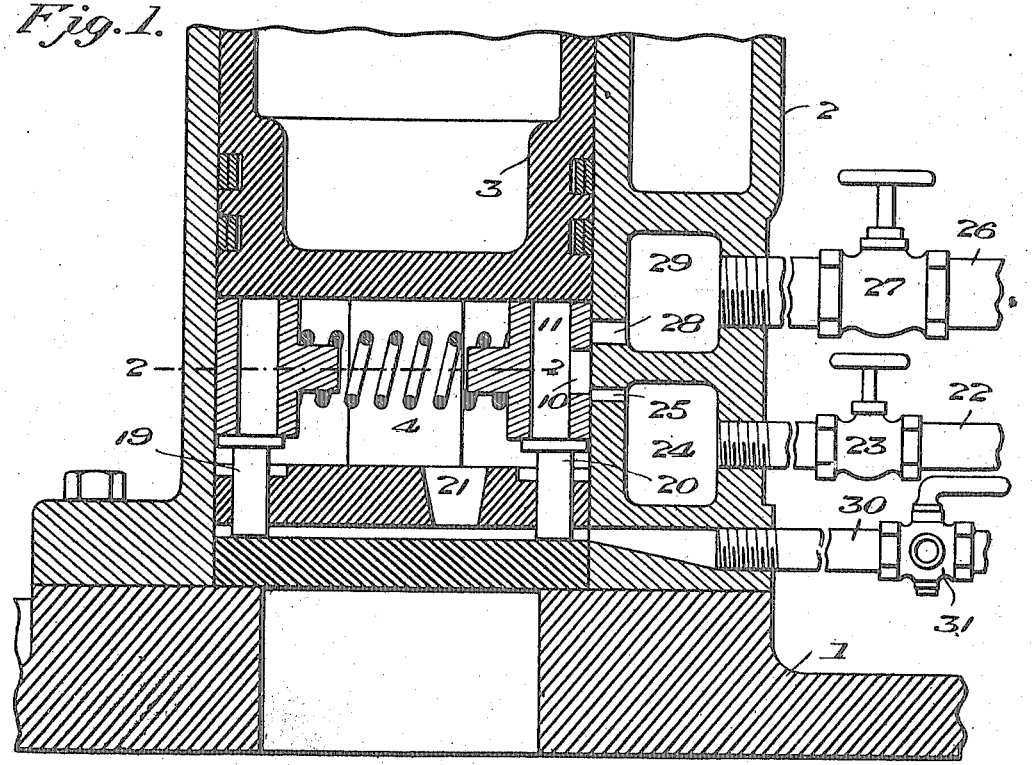
Figure 2:
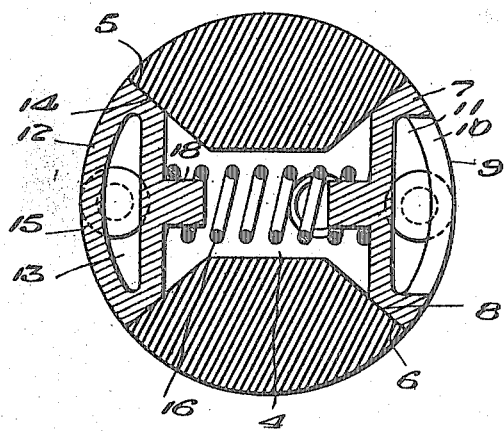

In the accompanying drawings:

Figure 1 is a detail vertical elevation of the lower part of the cylinder and piston of a jolt-ramming machine, illustrating the use of the invention; and Fig. 2 is a horizontal section on the line 2—2.

A portion of the base of a jolt-ramming machine is shown at 1 and a part of the lower end of the cylinder at 2. The piston 3 and the cylinder 2 are shown of relatively small diameter as the valve of the present invention is particularly adapted for use with a small cylinder and piston. The valves shown in my earlier patents and applications do not operate as satisfactorily on a machine having a small cylinder as on one of larger size because the parts of said valves do not conveniently lend themselves to small size.

One way of carrying out the present invention is to provide a chamber 4 extending diametrically through the piston 3 and provided at its opposite ends with the flared seats 5, 6 whose walls converge to the chamber 4 and are straight. The valve 7 has converging sides or walls 8 adapted to fit the walls of the seat 6; its outer surface 9 being on the same arc as the wall of the cylinder 2 and fitting and sliding thereagainst. The valve has an arc shaped port 10 and a vertical chamber 11.

A shoe 12 having a vertical chamber 13, is provided with converging sides or walls 14 adapted to fit the walls of the seat 5. The outer face 15 of the shoe is on an arc corresponding to that of the wall of the cylinder 2 and fitting and sliding thereagainst. An expansion coil spring 16 is interposed between the valve 7 and shoe 12, its ends receiving lugs 17 and 18 on the inner faces of the shoe and valve. The shoe serves as a backing or support for spring 16, the latter pressing the shoe and valve in opposite directions against the wall of the cylinder.

As in my earlier patents, there are provided stools or stop pins 19 and 20 slidably and loosely carried by the piston, against which the shoe and valve respectively strike to prevent them from knocking below their proper normal positions when the piston is at the bottom of the cylinder. A port 21 affords communication between the chamber 4 and the bottom of cylinder 2. Air pressure is admitted through pipe 22 under the control of valve 23 into chamber 24 and through port 25 into port 10, thence through port 21, to a point below the piston, to elevate the latter. An exhaust pipe 26 controlled by valve 27 is for letting off the exhaust from port 28, through chamber 29.

The pipe 30 and three-way valve 31 for admitting pressure below the piston may be used, or not, as desired, said pipe and valve having nothing to do with the present invention.

The flaring seats 5, 6 and corresponding walls 8 and 14 on the valve 7 and shoe 12 are not necessary to the successful operation of the invention which resides in the use of a shoe at one side of the piston, a valve at the other side of the piston, and spring means for holding the shoe and valve against the wall of the cylinder in which the piston moves.

Having thus described my invention, what I claim as new and desire to secure by Letters Patent, is:—

1. In a jolt-ramming machine, having a cylinder, and a piston provided with a chamber extending therethrough from side to side thereof, a valve located in one end of the chamber and adapted to slide against the wall of the cylinder, a shoe located in the other end of the chamber and adapted to slide against the wall of the cylinder, and a spring interposed between the valve and shoe which keeps them seated against the wall of the cylinder.

2. In a jolt-ramming machine, having a cylinder, and a piston, a valve located at one side of the piston and bearing against the wall of the cylinder, a shoe located at the other side of the piston and bearing against the wall of the cylinder, and spring means interposed between the valve and shoe which keeps them against the wall of the cylinder.

3. In a jolt-ramming machine, having a cylinder, and a piston, a valve located at one side of the piston and adapted to move up and down while bearing against the wall of the cylinder, a shoe located at the other side of the piston and adapted to move up and down while bearing against the wall of the cylinder, a spring interposed between the valve and shoe which keeps them against the wall of the cylinder, and pins or stools loosely carried by the piston which are adapted to strike the bottom of the cylinder and to respectively form stops for the valve and shoe to prevent them from knocking below their normal positions.

In testimony whereof, I hereunto affix my signature.

WILLIAM C. NORCROSS.